United States Patent
Ueda (10) Patent No.: US 8,210,903 B2
(45) Date of Patent: Jul. 3, 2012

(54) METHOD OF MANUFACTURING GLASS SUBSTRATE FOR MAGNETIC DISK, METHOD OF MANUFACTURING MAGNETIC DISK, AND POLISHING APPARATUS OF GLASS SUBSTRATE FOR MAGNETIC DISK

(75) Inventor: Masaaki Ueda, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/088,836

(22) PCT Filed: Sep. 20, 2007

(86) PCT No.: PCT/JP2007/068284
§ 371 (c)(1),
(2), (4) Date: Mar. 31, 2008

(87) PCT Pub. No.: WO2008/041493
PCT Pub. Date: Apr. 10, 2008

(65) Prior Publication Data
US 2009/0233529 A1   Sep. 17, 2009

(30) Foreign Application Priority Data
Sep. 29, 2006   (JP) .................................. 2006-269723

(51) Int. Cl.
*B24B 1/00* (2006.01)
(52) U.S. Cl. ............. 451/41; 451/51; 451/465; 451/466
(58) Field of Classification Search .................... 451/41, 451/51, 463–486
See application file for complete search history.

(56) References Cited

U.S. PATENT DOCUMENTS

| | | | | | |
|---|---|---|---|---|---|
| 1,395,245 | A | * | 11/1921 | Anderson | 451/471 |
| 2,624,217 | A | * | 1/1953 | Clark | 408/155 |
| 2,782,572 | A | * | 2/1957 | Clark | 451/471 |
| 2,976,774 | A | * | 3/1961 | Hess | 408/83.5 |
| 3,099,849 | A | * | 8/1963 | Bell et al. | 15/88.3 |
| 4,044,508 | A | * | 8/1977 | Frederick | 451/27 |
| 6,280,294 | B1 | * | 8/2001 | Miyamoto | 451/34 |
| 7,351,130 | B1 | * | 4/2008 | Chang | 451/11 |
| 2001/0055935 | A1 | * | 12/2001 | Miyamoto | 451/35 |
| 2006/0128278 | A1 | * | 6/2006 | Miyamoto | 451/44 |

FOREIGN PATENT DOCUMENTS

| | | |
|---|---|---|
| JP | 2004-155652 A | 6/2004 |
| JP | 2006-043842 A | 2/2006 |
| JP | 2006-082219 A | 3/2006 |
| WO | 2006/019170 A | 2/2006 |

* cited by examiner

*Primary Examiner* — Maurina Rachuba
(74) *Attorney, Agent, or Firm* — Sughrue Mion, PLLC (57) ABSTRACT

A method of manufacturing a glass substrate for a magnetic disk is provided, by which polishing accuracy on an inner circumferential end face of a glass substrate is improved, and a thermal asperity trouble can be avoided.

In a method of manufacturing a glass substrate for a magnetic disk, by which an inner circumferential end face of a cylindrical polishing object 12 is polished, the polishing object including a plurality of glass substrates 20 stacked on one another, a plurality of polishing cloths disposed around a rotation axis of an inner circumference polishing section having the rotation axis are contacted to the inner circumferential end face 116 of the polishing object at even pressure, then a polishing liquid is supplied between the inner circumferential end face of the polishing object and the inner circumference polishing section, and then the inner circumference polishing section and the polishing object are relatively rotated/moved with the rotation axis as a center, or relatively moved in a direction of the rotation axis, thereby the inner circumferential end face of the polishing object is polished.

23 Claims, 5 Drawing Sheets

METHOD OF MANUFACTURING GLASS SUBSTRATE FOR MAGNETIC DISK, METHOD OF MANUFACTURING MAGNETIC DISK, AND POLISHING APPARATUS OF GLASS SUBSTRATE FOR MAGNETIC DISK

TECHNICAL FIELD

The present invention relates to a method of manufacturing a glass substrate for a magnetic disk, by which an inner circumferential end face of a glass substrate is polished, a method of manufacturing a magnetic disk, and a polishing apparatus of the glass substrate for a magnetic disk.

BACKGROUND ART

Recently, with sophistication of informatization technology, information recording technology, particularly magnetic recording technology is significantly improved. As a substrate for a magnetic recording medium such as HDD (Hard Disk Drive) as one of media for such magnetic recording, an aluminum substrate has been widely used. However, with reduction in size or thickness of a magnetic disk, and with increase in recording density, demand for a glass substrate is now increased, the glass substrate being high in surface flatness and high in strength compared with the aluminum substrate.

Moreover, with increase in recording density in magnetic recording technology, a magnetic head is now changed from a thin film head to a magnetoresistive head (MR head) or a giant magnetoresistive head (GMR head), and flying height of a magnetic head on a substrate is accordingly reduced to about 8 nm. A magnetic head mounted with such a magnetoresistive effect element sometimes induces a thermal asperity trouble as a unique trouble of the head.

The thermal asperity trouble is a trouble where when a magnetic head in flying in the air passes above a small convex or concave portion on a magnetic disk surface, the magnetoresistive effect element is heated due to adiabatic compression of air or contact with the small portion, causing a read error. Therefore, for the magnetic head mounted with the magnetoresistive effect element, a magnetic disk surface is required to have extremely high smoothness and flatness. Moreover, when a magnetic layer is formed on a glass substrate with dust or a foreign substance being adhered, a convex portion is inconveniently formed, therefore the glass substrate is required to be highly cleaned for completely removing the dust or the foreign substance.

Furthermore, substrate size recently tends to be reduced in order to mount a large-capacity magnetic recording medium on a mobile device. Therefore, a 1.8-inch substrate, a 1-inch substrate, or a further small-size substrate is required rather than a 3.5-inch substrate or a 2.5-inch substrate in the past. When a substrate is reduced in size in this way, an allowable dimension error is also reduced, consequently more precise inner-diameter processing is required.

In addition to smoothness and flatness of the magnetic disk surface, strict accuracy control is required for a dimension error in inner diameter of a circular hole provided in a center of a magnetic disk. This is because a dimension error of an inner circumferential end face of a magnetic disk has a direct influence on setting accuracy when the magnetic disk is fittingly set on a spindle motor of HDD. Moreover, a large dimension error in inner diameter leads to a possibility of inducing a mechanical error in stacking servo (writing of servo information into a magnetic disk) performed before the magnetic disk is assembled in a magnetic disk device such as HDD, or a possibility of inducing bad fitting of the disk with a spindle in disk stacking. The inner circumferential end face of a magnetic disk is small in surface area compared with a main surface, and when a rotational center of the magnetic disk is displaced due to the dimension error in inner diameter, it is difficult to dispose a head of HDD in a correct position on the HDD, consequently data are hardly recorded or reproduced.

Moreover, since magnetic disk is subjected to read/write of data while rotating at high speed, it is necessary that data on the magnetic disk do not move even during such high-speed rotation. Therefore, accuracy control of a dimension error in inner diameter is particularly important for a substrate for a magnetic disk.

Furthermore, when attention is paid on data access for HDD, a servo pattern to be an index for positioning is previously written into a magnetic disk assembled in the HDD to accurately store/reproduce data of the magnetic disk. Such writing of the servo pattern is carried out while the magnetic disk is fittingly set on a device called servo writer. The magnetic disk written with the servo pattern is temporarily separated from the servo writer, and fittingly set on the spindle motor of HDD being a product.

In the case that the dimension error in inner diameter of a magnetic disk is large, when the magnetic disk is assembled in HDD, alignment between a servo pattern and a position of a recording/reproducing head of HDD being a product is disordered, therefore recording/reproducing of data is still not normally performed. While a technique of adjusting alignment for correcting such a positional relationship is disclosed, the technique does not give a drastic solution for suppressing the dimension error in inner diameter.

Under such a situation, to avoid the thermal asperity trouble, it is necessary to smoothen a surface of a magnetic disk, in addition, to smoothen (mirror-finish) an end face of the magnetic disk. Moreover, to prevent movement of a rotation axis when the magnetic disk is fitted with the spindle motor, an inner circumferential end face of the magnetic disk needs to be processed at high accuracy. Thus, disclosure is made on a technique of polishing the inner circumferential end face of the magnetic disk into an end face having a certain roughness or lower by using a polishing brush having brush hair curled in a meandering pattern (for example, see Patent Document 1 (JP-A-2004-155652)).

Patent document 1: JP-A-2004-155652

DISCLOSURE OF THE INVENTION

Problems that the Invention is to Solve

Moreover, further improvement in recording density is recently required, and further improvement in inner diameter tolerance of a magnetic disk is accordingly required. However, in a configuration that a polishing brush or a polishing pad is used as a polishing material, there has been a limit in improving processing accuracy.

Figure 1:
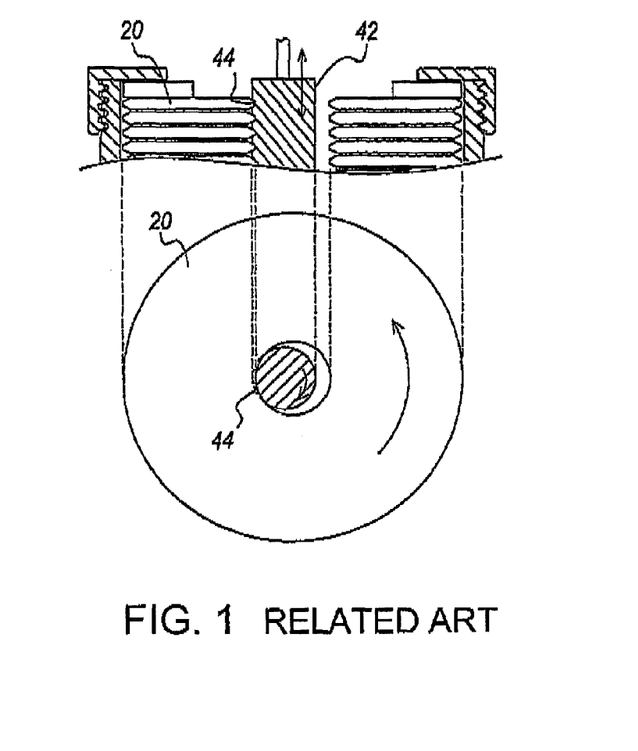
FIG. 1 shows a diagram for illustrating a first related art, which shows an explanatory diagram showing a polishing step of an inner circumferential end face when a polishing brush is used as a polishing material.

FIG. 1 shows a diagram for illustrating a first related art, which is an explanatory diagram showing a polishing step of an inner circumferential end face when a polishing brush 42 is used as a polishing material. Outer diameter of the polishing brush 42 needs to be formed smaller than inner diameter of a glass substrate 20 in order to insert the brush into the inner diameter of the glass substrate 20. To polish the inner circumferential end face, the polishing brush 42 is revolved on inner circumference of the glass substrate 20 while rotating in a direction opposite to a rotation direction of the glass substrate 20 as shown by an arrow in the figure. Furthermore, the polishing brush 42 itself is swung at low speed in a direction of a rotation axis of the polishing material (stroke motion) to polish the inner circumferential end face as a whole. While the outer diameter of the polishing brush 42 is smaller than the inner diameter of the glass substrate 20, the polishing brush 42 is generally contacted to the inner circumferential end face of the glass substrate 20 at a plane 44 due to a brush configuration of the polishing brush, as shown in FIG. 1. Consequently, the glass substrate 20 is applied with a pressing force biased in one direction toward the plane 44 of the polishing brush 42.

In such a configuration using the polishing brush 42, an outer circumferential shape of the polishing brush 42 is unfixed, and when the polishing brush 42 is contacted to the inner circumferential end face of the glass substrate 20, the polishing brush 42 has certain elastic force caused by each strand of hair of the brush, therefore tolerance of inner diameter is increased, and the inner diameter is accordingly harder to be controlled. Particularly, in the case of the glass substrate 20 used for a magnetic disk, a strong demand exists for large-volume and low-cost production, and therefore increase in yield is necessary. However, polishing using the polishing brush 42 has a limit in control or management of inner diameter accuracy, resulting in extremely large number of bad products due to fluctuation in the inner diameter.

To improve such processing accuracy, it can be further considered that a rod-like polishing pad, in which at least an outer circumferential surface is configured by a polishing cloth, is used in place of the polishing brush 42, and pressed to the inner circumferential end face for polishing.

Figure 2:
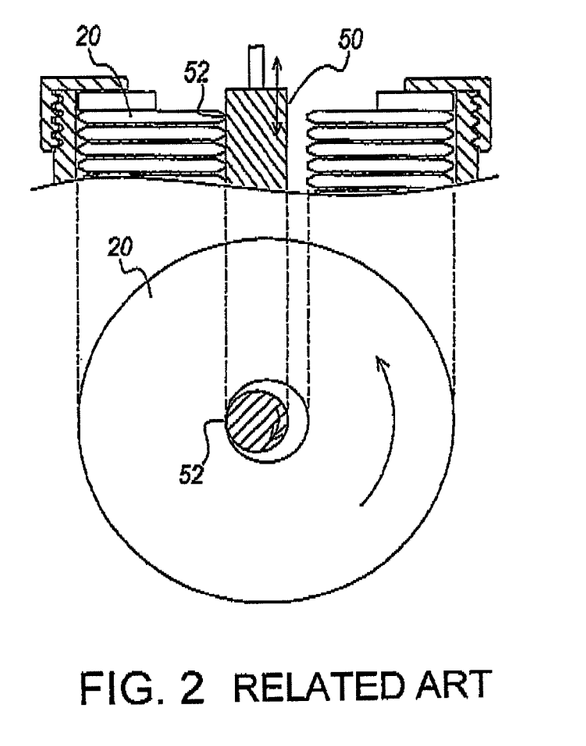
FIG. 2 shows a diagram for illustrating a second related art, which shows an explanatory diagram showing a polishing step of an inner circumferential end face when a polishing pad is used as a polishing material.

FIG. 2 shows a diagram for illustrating a second related art, which is an explanatory diagram showing a polishing step of an inner circumferential end face when a polishing pad 50 is used as a polishing material. Outer diameter of the polishing pad 50 also needs to be formed smaller than inner diameter of a glass substrate 20 in order to insert the pad into the inner diameter of the glass substrate. The polishing pad 50 is revolved on inner circumference of the glass substrate 20 while rotating in a direction opposite to a rotation direction of the glass substrate 20 as shown by an arrow in the figure. Furthermore, the polishing pad 50 itself is swung at low speed in a direction of a rotation axis (stroke motion) to polish the inner circumferential end face as a whole. While the outer diameter of the polishing pad 50 is smaller than the inner diameter of the glass substrate 20, and the polishing pad 50 has a fixed form, the polishing pad 50 is contacted to the inner circumferential end face at a line 52 or a point, and consequently the glass substrate 20 is applied with a pressing force biased in one direction via only the line 52.

When the polishing pad 50 is used for polishing in this way, since a contact surface with the glass substrate 20 is reduced, the polishing pad 50 polishes the inner circumferential end face while revolvably moving on the inner circumferential end face, consequently polishing time cannot be reduced. Therefore, the inner circumferential end face has not been able to be evenly polished due to change in pressing force to the inner circumferential end face during polishing because of line contact, causing a problem of increase in inner diameter circularity or concentricity. Furthermore, since only polishing at low speed can be performed, productivity has been hard to be improved.

Moreover, a problem occurs in the configuration of the first or second related art, that is, since the polishing brush or the polishing pad needs to be revolved for polishing, an axis of the polishing brush or the polishing pad may move during polishing the inner circumference, leading to degradation of circularity and concentricity of the inner circumferential end face after polishing the inner circumference. Therefore, it has been extremely difficult to achieve a dimension (shape) of the inner diameter to which particularly severe requirements are recently made.

The invention was made in the light of the above difficulties existing in polishing treatment of a glass substrate, and a problem of the invention is to provide a method of manufacturing a glass substrate for a magnetic disk, a method of manufacturing a magnetic disk, and a polishing apparatus of a glass substrate for a magnetic disk, those being novel and improved, by which high processing accuracy can be obtained on an inner circumferential end face of the glass substrate, and more particularly, circularity and concentricity of the inner circumferential end face of the glass substrate after polishing the inner circumference can be significantly improved compared with those in the past.

Means for Solving the Problems

To solve the problem, according to an aspect of the invention, a method of manufacturing a glass substrate for a magnetic disk is provided, by which an inner circumferential end face of a cylindrical polishing object is polished, the polishing object including a plurality of disk-like glass substrates stacked on one another, each substrate having an inner hole formed in its center, wherein a plurality of polishing cloths disposed around a rotation axis of an inner circumference polishing section having the rotation axis are contacted to the inner circumferential end face of the polishing object at even pressure, then a polishing liquid is supplied between the inner circumferential end face of the polishing object and the inner circumference polishing section, and then the inner circumference polishing section and the polishing object are relatively rotated/moved with the rotation axis as a center, or relatively moved in a direction of the rotation axis, thereby the inner circumferential end face of the polishing object is polished.

According to such a configuration, the polishing cloths can be pressed in face contact to the inner circumferential end face as a whole at even pressing force. Moreover, since the rotation axis of the inner circumference polishing section need not be revolved or moved, stable inner-diameter circularity, stable concentricity, and low inner diameter tolerance can be achieved. Furthermore, since the inner circumferential end face can be polished in a manner of face contact with the polishing cloths, high polishing speed, that is, high productivity can be obtained compared with a case that the inner circumferential end face is polished in a manner of point contact, line contact or the like in the past.

Here, the rotation axis of the inner circumference polishing section is a straight line that is spatially fixed to be a rotation center when the inner circumference polishing section is rotationally moved, and the rotation axis is adjusted to correspond to a central axis of inner circumference of the polishing object. Rotation/movement involves rotation about the rotation axis of the inner circumference polishing section, namely, rotation of the inner circumference polishing section on its own axis, and movement of the polishing section in a direction perpendicular to the rotation axis while rotating on its own axis in such a way. That is, the rotation/movement includes two types of operation of (1) rotation, and (2) movement in a rotation axis direction while rotating. In polishing according to the manufacturing method, the inner circumference polishing section is rotated in a manner that a center of a circular inner hole formed in a center of a disk-like glass substrate corresponds to the rotation axis of the inner circumference polishing section. Thus, the inner circumference polishing section can polish the inner circumference end face without any movement of the axis. Therefore, high circularity can be achieved.

The plurality of polishing cloths may be arranged to be an even number of polishing cloths. According to such a configuration, since the polishing cloths are reversely formed in pairs with a core of the inner circumference polishing section between them, pressing force to the inner circumferential end face becomes uniform, and consequently smaller inner diameter circularity and smaller concentricity can be obtained.

The plurality of polishing cloths are preferably disposed so as to be in positions reverse to one another.

The plurality of polishing cloths are preferably disposed around the inner circumference polishing section so as to be equidistant from one another.

A plurality of polishing cloths are disposed so as to be in positions reverse to one another, or disposed so as to be equidistant from one another, thereby when the inner circumferential end face is polished, in the case that the inner circumference polishing section is rotated, the section can be rotated without any movement of the rotation axis. Thus, the circularity and concentricity of the inner circumferential end face of the glass substrate can be further improved.

A configuration may be provided, in which the plurality of polishing cloths are moved in a direction perpendicular to an extending direction of the rotation axis (rotation radius direction or rotation/movement radius direction), thereby the inner circumference polishing section is contacted by pressure to the inner circumferential end face of the polishing object.

According to such a configuration, contact pressure between the inner circumference polishing section and the inner circumferential end face of the polishing object can be adjusted to be an appropriate value, consequently inner diameter circularity and concentricity, which are more stable and smaller, and low inner diameter tolerance can be achieved.

A configuration may be provided, in which a sliding surface sloped with respect to a rotation axis direction is formed on an inner circumferential edge of the inner circumference polishing section, and a drill rod is provided, which is slidably contacted to the sliding surface, and the polishing cloths are moved in a direction perpendicular to an extending direction of the rotation axis by a wedge effect of the drill rod.

By providing such a slide mechanism using the sliding surface, only by sliding the drill rod in the rotation axis direction, a distance and pressing force of each polishing cloth in the direction perpendicular to the extending direction of the rotation axis can be adjusted. That is, only by forcing the inner circumference polishing section along the inner circumferential end face, the polishing cloths can be pressed to the inner circumferential end face. Moreover, since such slide of the drill rod can be performed without stopping rotation of a polishing drive section, the inner circumference polishing section can be adjusted even during polishing the polishing object.

A configuration may be provided, in which the polishing cloths and the inner circumferential end face of the polishing object are in face contact of 50% or more with each other. Contact area between the polishing cloths and the inner circumferential end face of the polishing object is made large in this way, thereby polishing speed can be increased, and a glass substrate of which the inner diameter circularity and concentricity are better (smaller) can be obtained.

A configuration may be provided, in which an outline of each polishing cloth has a shape in accordance with the inner circumferential end face of the polishing object. According to such a configuration, the polishing cloths are adapted in shape to the inner circumferential end face, and thus a contact surface of each polishing cloth can be securely contacted to the inner circumferential end face, and consequently inner diameter circularity and concentricity, which are more stable and smaller, and low inner diameter tolerance can be achieved.

To solve the problem, according to still another viewpoint of the invention, a method of manufacturing a glass substrate for a magnetic disk is provided, by which an inner circumferential end face of a cylindrical polishing object is polished, the polishing object including a plurality of disk-like glass substrates stacked on one another, each substrate having an inner hole formed in its center, wherein polishing cloths are pressed in face contact to the inner circumferential end face, then a polishing liquid is supplied between the inner circumferential end face of the polishing object and an inner circumference polishing section, and then the polishing cloths and the inner circumferential end face are relatively moved, thereby the inner circumferential end face of the polishing object is polished.

According to such a configuration, the polishing cloths can be pressed in face contact to the inner circumferential end face of the glass substrate at even pressing force, consequently high processing accuracy can be obtained on the inner circumferential end face of the glass substrate.

To solve the problem, according to another viewpoint of the invention, a method of manufacturing a glass substrate for a magnetic disk is provided, by which an inner circumferential end face of a disk-like glass substrate is polished, the substrate having an inner hole formed in its center, wherein a plurality of polishing cloths disposed around a rotation axis of an inner circumference polishing section having the rotation axis are contacted by pressure to the inner circumferential end face of the disk-like glass substrate at even pressure, then a polishing liquid is supplied between the inner circumferential end face and the inner circumferential end polishing section, and then the inner circumferential end polishing section and the glass substrate are relatively rotated/moved with the rotation axis as a center, or relatively moved in a direction perpendicular to a main surface of the glass substrate, thereby the inner circumferential end face of the polishing object is polished.

The invention can be applied to not only the inner circumferential end face of the cylindrical polishing object including the plurality of disk-like glass substrates stacked on one another, each substrate having an inner hole formed in its center, but also the inner circumferential end face of a disk-like glass substrate having an inner hole formed in its center, that is, the invention can be applied to a single glass substrate. Therefore, in the case of a single glass substrate, the inner circumferential end face can be also polished at high accuracy.

To solve the problem, according to another aspect of the invention, a method of manufacturing a magnetic disk is provided, wherein at least a magnetic layer is formed on a surface of the glass substrate obtained according to the relevant method of manufacturing a glass substrate for a magnetic disk. Thus, since inner diameter tolerance can be reduced compared with in the past, even in the case of a magnetic disk having increased recording density, a read error of a signal can be prevented.

To solve the problem, according to still another aspect of the invention, a polishing apparatus of a glass substrate for a magnetic disk is provided, which polishes an inner circumferential end face of a cylindrical polishing object including a plurality of disk-like glass substrates stacked on one another, each substrate having an inner hole formed in its center, the apparatus having an inner circumference polishing section that has a rotation axis, and has a plurality of polishing cloths disposed around the rotation axis, and presses the plurality of polishing cloths to the inner circumferential end face of the polishing object at even pressure, a polishing liquid supply section that supplies a polishing liquid between the polishing cloths and the inner circumferential end face of the polishing object, and a polishing drive section that relatively rotates/moves the inner circumference polishing section and the polishing object with the rotation axis as a center, or relatively moves them in a rotation axis direction so that the inner circumferential end face of the polishing object is polished.

According to such a configuration, as in the method of manufacturing a glass substrate for a magnetic disk, the polishing cloths can be pressed in face contact to the inner circumferential end face of the glass substrate at even pressing force, consequently inner diameter circularity and concentricity, which are small and stable, and low inner diameter tolerance can be achieved.

A component corresponding to a dependant in the method of manufacturing a glass substrate for a magnetic disk, or description of the component can be applied to the relevant polishing apparatus of a glass substrate for a magnetic disk.

Moreover, a method of manufacturing a glass substrate for a magnetic disk according to the invention includes an inner circumference polishing step of polishing an inner circumferential end face of a cylindrical polishing object including a plurality of disk-like glass substrates stacked on one another, each substrate having an inner hole formed in its center, the method being acceptably designed such that a polishing member, which has a rotation axis and polishing parts provided around the rotation axis, is inserted into an inner hole of the polishing object, then the polishing parts are expanded in a direction perpendicular to the rotation axis of the polishing member, thereby the polishing parts are elastically pressed to the inner circumferential end face, and while the center of the inner hole of the glass substrate is allowed to correspond to the axis of the rod-like polishing member, at least one of the polishing object and the polishing member is relatively moved, so that the inner circumferential end face of the glass substrate is polished.

Moreover, the method of manufacturing a glass substrate for a magnetic disk according to the invention may be further designed such that the plurality of polishing parts of the polishing member are provided in positions reverse to one another.

Moreover, the method of manufacturing a glass substrate for a magnetic disk according to the invention may be designed such that each of the polishing parts includes a polishing cloth or a grinding stone.

Moreover, the method of manufacturing a glass substrate for a magnetic disk according to the invention may be designed such that the polishing parts include polishing cloths respectively, and a polishing liquid containing abrasive grains is supplied between the polishing cloths and the inner circumferential end face, then at least one of the polishing object and the polishing member is relatively moved, thereby the inner circumferential end face of the glass substrate is polished.

Moreover, the method of manufacturing a glass substrate for a magnetic disk according to the invention may be designed such that the polishing parts include grinding stones respectively, and a liquid coolant is supplied between the grinding stones and the inner circumferential end face, then at least one of the polishing object and the polishing member is relatively moved, thereby the inner circumferential end face of the glass substrate is polished.

Moreover, the method of manufacturing a glass substrate for a magnetic disk according to the invention may be designed such that the method further includes a chemical strengthening treatment step in which the glass substrate is contacted to a chemical strengthening treatment liquid, thereby part of ions contained in the glass substrate are substituted by ions in the chemical strengthening treatment liquid, thereby the glass substrate is chemically strengthened, and an inner circumference polishing step is performed after the chemical strengthening treatment step, and the inner circumferential end face of the glass substrate is polished in the inner circumference polishing step such that at least part of a compressive stress layer is remained, the compressive stress layer being formed on the inner circumferential end face of the glass substrate by the chemical strengthening treatment step.

Moreover, the method of manufacturing a glass substrate for a magnetic disk according to the invention may be designed such that thickness of the compressive stress layer formed in the chemical strengthening treatment step is less than 150 µm.

Moreover, the method of manufacturing a glass substrate for a magnetic disk according to the invention may be designed such that removal depth is less than 5 µm in the inner circumference polishing step.

Moreover, the method of manufacturing a glass substrate for a magnetic disk according to the invention may be designed such that the inner circumferential end face is polished in the inner circumference polishing step such that circularity of an inner hole is within 5 µm.

Moreover, the method of manufacturing a glass substrate for a magnetic disk according to the invention may be designed such that the method further includes a main surface polishing step of polishing a main surface of the glass substrate, and the main surface is polished in the main surface polishing step such that surface roughness (Ra) is 0.2 nm or less when the surface roughness is measured by an atomic force microscope.

Moreover, the method of manufacturing a glass substrate for a magnetic disk according to the invention may be designed such that the glass substrate has a chamfered surface between the main surface and the inner circumferential end face, and the method further includes a chamfered-surface polishing step in which polishing cloths are used, the polishing cloths being contactable to the chamfered portion over the whole circumference of the chamfered portion at a time, and while the polishing cloths are pressed to the chamfered portion over the whole circumference of the chamfered portion at a time, the polishing cloths and the glass substrate are relatively moved, thereby the chamfered surface is polished.

Advantage of the Invention

As described hereinbefore, according to the inner circumference polishing section of the invention, polishing cloths of the inner circumference polishing section is made in face contact to an inner circumferential end face as a whole of a polishing object, and pressing force in such face contact can be made uniform, therefore high processing accuracy can be obtained, that is, inner diameter circularity and concentricity can be made small and stable, and thus inner diameter tolerance can be kept low, and furthermore polishing speed can be increased.

BEST MODE FOR CARRYING OUT THE INVENTION

Description of the Reference Numerals

| | |
|---|---|
| 10 | polishing apparatus |
| 12 | polishing object |
| 18 | polishing drive section |
| 20 | glass substrate |
| 40 | nozzle (polishing liquid supply section) |
| 110 | inner circumference polishing section |
| 112 | polishing body |
| 114 | polishing cloth |
| 150 | sliding surface |
| 154 | drill rod |

Hereinafter, a preferred embodiment of the invention will be described in detail with reference to accompanying drawings. In the description and the drawings, respective components having substantially the same function and configuration are marked with the same reference, and repeated description of them are omitted.

A glass substrate for a magnetic disk is formed via several steps. First, a wafer is cut into a disk shape, and then opened with an inner hole to be formed into a shape of a glass substrate. Then, chamfering is made on an outer circumferential end face and an inner circumferential end face of the glass substrate formed by cutting, and then both the end faces are polished. Next, a main surface of the glass substrate is also polished, and finally the glass substrate that has been polished is subjected to chemical strengthening treatment.

An embodiment of the invention relates to a method of manufacturing a glass substrate for a magnetic disk, and particularly relates to polishing of an inner circumferential end face of a glass substrate. Hereinafter, description is made on a method of polishing the inner circumferential end face of the glass substrate in the embodiment.

(Polishing Apparatus and Polishing Method)

Figure 3:
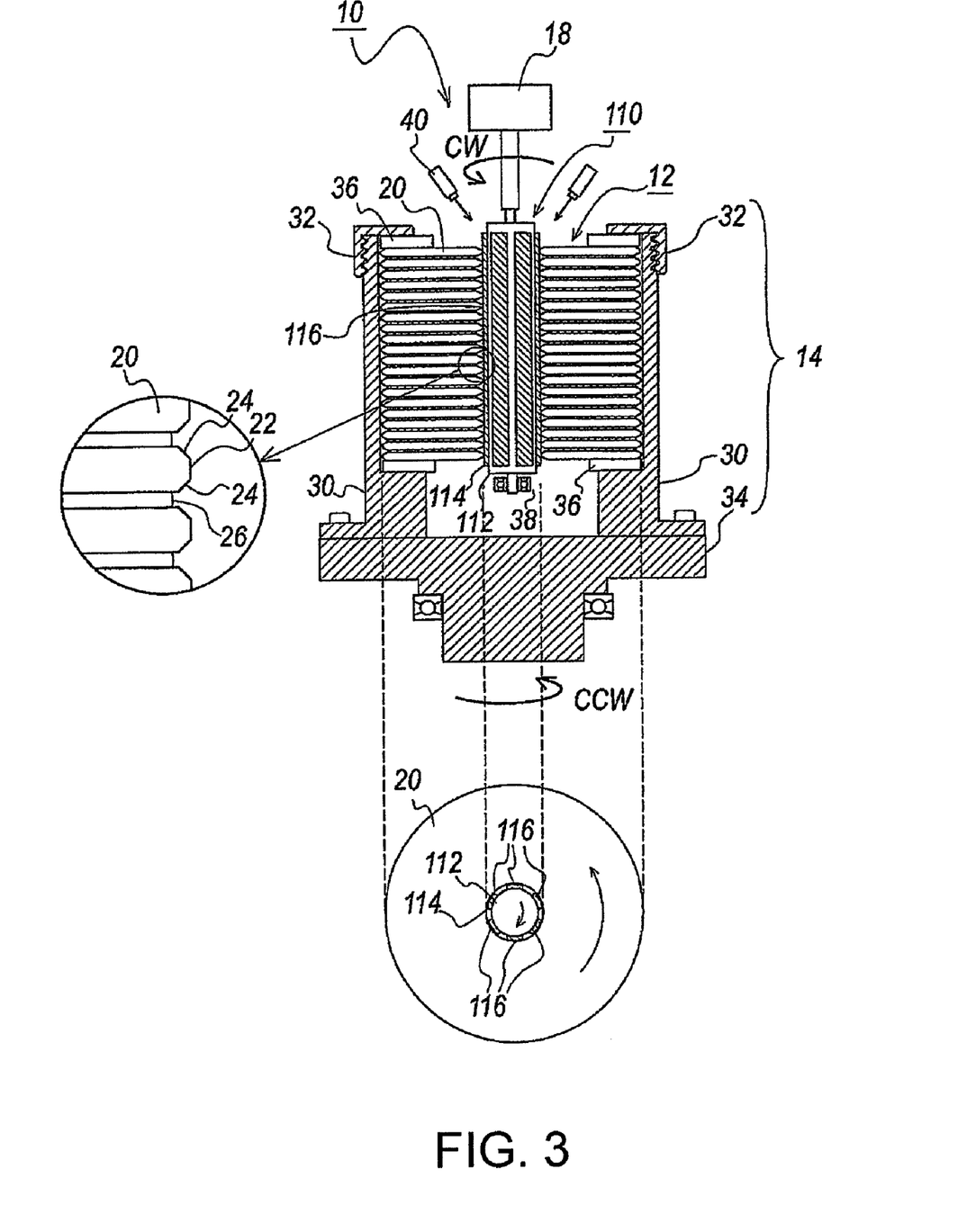
FIG. 3 shows an explanatory diagram showing a polishing step of an inner circumferential end face in the case that an inner circumference polishing section is used as a polishing material in the invention.

FIG. 3 shows a vertical section diagram for illustrating a configuration of a polishing apparatus 10 of a glass substrate for a magnetic disk. Such a polishing apparatus 10 of a glass substrate includes a polishing object 12, a support section 14, an inner circumference polishing section 110, and a polishing drive section 18 to polish an inner circumferential end face of the polishing object 12.

The polishing object 12 is formed in a cylindrical shape by stacking a plurality of glass substrates 20. In each glass substrate 20, an outer circumferential end face and an inner circumferential end face are chamfered in a forming step, and for example, a sidewall portion (T plane) 22 and a chamfered portion (C plane) 24 are formed on the inner circumferential end face as shown in an enlarged diagram in FIG. 3. The glass substrates 20 are stacked on one another via spacers 26. Each spacer 26 is provided for securely preventing the chamfered portions 24 of the inner and outer circumferential end faces of the glass substrate 20 from being insufficiently polished by a polishing brush, and for securely preventing breakage of the glass substrate or the like during polishing.

The support section 14 mainly includes a substrate case 30, a fastening cover 32, and a rotational holding stage 34. The substrate case 30 serves to accommodate the polishing object 12. Particularly, the substrate case 30 and the fastening cover 32 to be fitted with the substrate case 30 fasten the polishing object 12 via a color 36. By fastening the polishing object 12 by the substrate case 30 and the fastening cover 32 in such a way, a layout of respective glass substrates 20 as the polishing object 12 can be held without being influenced by rotation of the support section 14 and by rotation of an inner circumference polishing section 110 described later.

The rotational holding stage 34 fixedly holds the substrate case 30, and can rotate/move the substrate case 30 in both forward and reverse directions. Rotation speed of such a rotational holding stage 34 can be adjusted, and appropriate rotation speed can be selected depending on a purpose of polishing.

The inner circumference polishing section 110 has a rotation axis that is perpendicular to the glass substrates 20 as the polishing object 12, and corresponds to a central axis of the inner hole of the polishing object 12, and acts as a rotational center of the inner circumference polishing section 110, and includes a polishing body 112, and a plurality of polishing cloths 114 provided on a sidewall of the polishing body 112. Such a plurality of polishing cloths 114 may be made of a soft polisher using suede or velour, or may be made of a hard polisher including hard velour as material, formed resin, and pitch-impregnated suede, and arranged so as to form a part of a cylindrical shape with the rotation axis as a center. The polishing cloths 114 may be arranged such that respective centers of them are situated at approximately equal spaces to one another on an optional circumferential line. That is, the inner circumference polishing section 110 may be configured such that the plurality of polishing cloths 114 are disposed with an approximately equal interval about the central axis.

Outer diameter of the inner circumference polishing section 110 is formed to have a curved surface along an inner diametrical shape of the glass substrate 20, which fits with a circumferential surface 116 of inner diameter of the glass substrate 20. The inner circumference polishing section 110 is contacted to an inner circumferential end face of the polishing object 12 at even pressure, then a polishing liquid is supplied between the inner circumferential end face of the polishing object 12 and the inner circumference polishing section 110, and then the inner circumference polishing section 110 is rotated/moved with the rotation axis as a center in a direction of an arrow shown above the inner circumference polishing section 110 in FIG. 3, so that the polishing object 12 is polished. While rotation about the rotation axis of the inner circumference polishing section is referred to as rotation/movement here, the rotation/movement is not limited to such a motion, and includes a motion of moving in a rotation axis direction while rotating in such a way.

In this case, the glass substrate 20 may not be fixed and rotated on the support section 14. This is because since the inner circumference of the glass substrate 20 fits with the outer circumference of the inner circumference polishing section 110, sufficient polishing speed can be obtained only by rotation/movement of the inner circumference polishing section 110. However, it is not intended to avoid polishing while rotating the glass substrate 20 in a direction opposite to the rotational direction of the inner circumference polishing section 110. Specifically, for example, it is acceptable that the inner circumference polishing section 110 is fixed, and only the glass substrate 20 is rotated, or conversely, the glass substrate 20 is fixed, and only the inner circumference polishing section 110 is rotated, or both are rotated relatively to each other.

Moreover, the inner circumference polishing section 110 may be swung at low speed in a rotation axis direction in the inner hole with respect to the glass substrate 20 (stroke motion) so as to polish the inner circumferential end face as a whole of the polishing object 12.

Since the polishing cloths 114 of the inner circumference polishing section 110 are provided correspondingly to the inner diameter of the glass substrate 20, that is, since the cloths are formed on a curved surface having the same radius as that of an inner circumferential curved surface of the glass substrate 20, the polishing cloths 114 of the inner circumference polishing section 110 can be made in face contact to the inner circumferential end face of the glass substrate 20, and can be pressed to the inner circumferential end face with even and certain pressing force. In this way, the inner circumferential end face can be smoothly polished, and consequently inner diameter circularity and concentricity, those being small and stable, and low inner diameter tolerance can be achieved. Moreover, since the inner circumference polishing section 110 is in face contact to the glass substrate 20, unit pressing force applied to each polishing cloth 114 is low, and thus polishing heat can be suppressed, and consequently degradation in the inner circumferential end face of the glass substrate 20 can be prevented.

Here, the polishing cloths 114 and the inner circumferential end face of the glass substrate 20 are desirably in face contact of 50% or more to each other, and more desirably 60% or more to each other. By establishing such face contact of 50% or 60% or more, when the inner circumference polishing section 110 is rotated/moved, the polishing section can be stably operated, in addition, polishing speed can be increased by increasing percent of face contact. By increasing contact area between the polishing cloths 114 and the inner circumferential end face of the polishing object in this way, a glass substrate having better inner diameter circularity and better concentricity can be obtained.

However, when the number of the polishing cloths 114 of the inner circumference polishing section 110 is an odd number, pressing force to the inner circumferential end face is sometimes biased. Therefore, it is desirable that the number of such polishing cloths 114 is an even number, and polishing cloths 114 in pair are disposed in opposed positions of the polishing cloths 114. In FIG. 3, six polishing cloths 114 are arranged, and respective two pairs of polishing cloths 114 are reversely formed with a core of the inner circumference polishing section 110 between them. Thus, pressing force to the inner circumferential end face is uniform, and consequently the inner diameter circularity and concentricity can be more reduced.

While it was described that the outer diameter of the inner circumference polishing section 110 was corresponding to the inner diameter of the glass substrate 20 in the embodiment, when the outer diameter of the inner circumference polishing section 110 does not correspond to the inner diameter of the glass substrate 20, the outer diameter of the inner circumference polishing section 110 needs to be adjusted.

The inner circumference polishing section 110 in the embodiment may be contacted by pressure to the inner circumferential end face of the glass substrate 20 by moving the plurality of polishing cloths 114 in a direction perpendicular to an extending direction of the rotation axis, that is, by expanding/contracting the inner circumference polishing section 110.

When the inner circumference polishing section 110 is inserted into or extracted from the glass substrate 20, the outer diameter of the inner circumference polishing section 110 is temporarily contracted in order to prevent the inner circumference of the glass substrate 20 from being damaged. Hereinafter, a configuration of expanding/contracting the inner circumference polishing section 110 in this way is described in detail.

Figure 4:
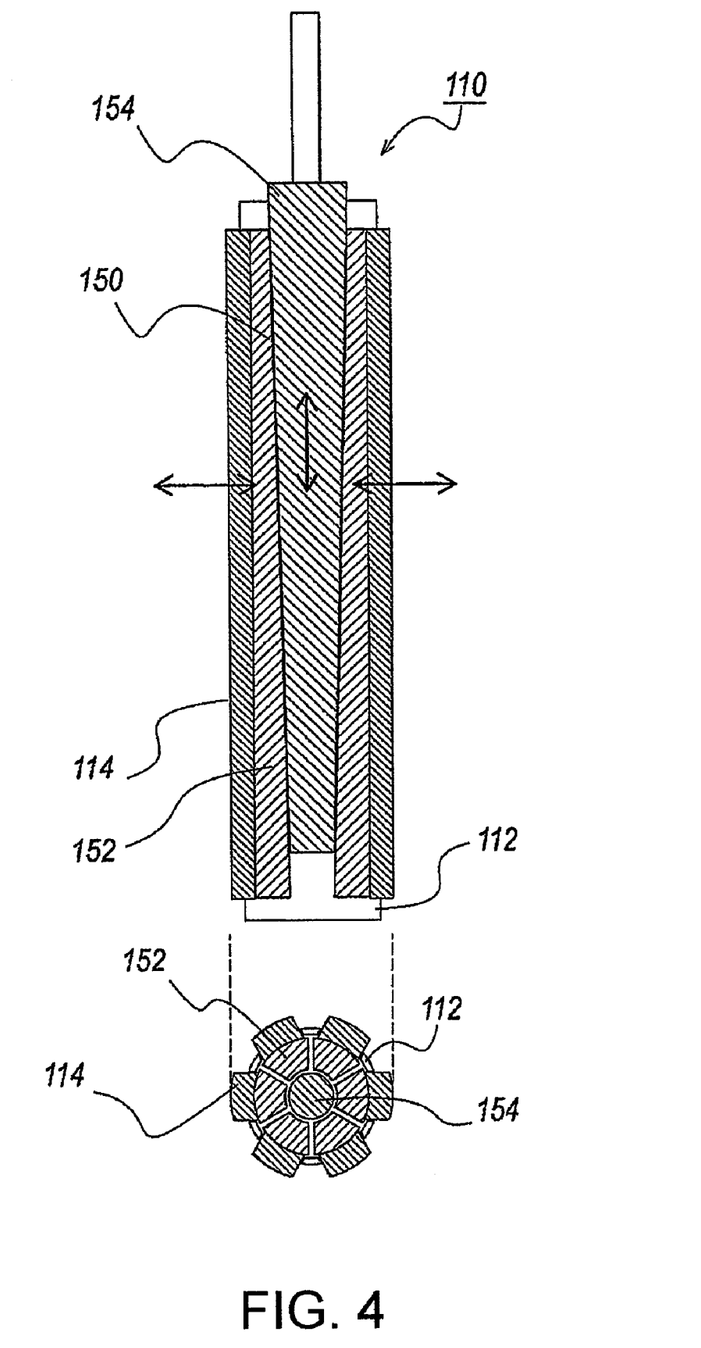
FIG. 4 shows a sectional diagram showing an example of an inner circumference polishing section having an expanding/contracting mechanism in a direction perpendicular to an extending direction of a rotation axis, used in the invention.

FIG. 4 shows a sectional diagram showing an example of the inner circumference polishing section 110 having an expanding/contracting mechanism in a direction perpendicular to the extending direction of the rotation axis. A polishing body 112 of such an inner circumference polishing section 110 is configured by an interlocking part 152, and a drill rod 154 that is slidably contacted to a tapered sliding surface 150 formed obliquely with respect to the rotation axis direction on an inner circumferential edge of the interlocking part 152. Due to a wedge effect on the sliding surface 150, the interlocking part 152 is operated with being interlocked with the drill rod 154, and displacement of the drill rod 154 in the rotation axis direction is converted into displacement of the interlocking part 152 in the direction perpendicular to the extending direction of the rotation axis. For example, in the case of the inner circumference polishing section 110 of FIG. 4, when the drill rod 154 is slid downward in the rotation axis direction in the figure, the interlocking part 152 is transferred outward in the direction perpendicular to the extending direction of the rotation axis, so that the inner circumference polishing section 110 is expanded. When the drill rod 154 is slid upward in the rotation axis direction in the figure, the interlocking part 152 is transferred inward in the direction perpendicular to the extending direction of the rotation axis, so that the inner circumference polishing section 110 is contracted.

By providing such a slide mechanism using the sliding surface 150, only by sliding the drill rod 154 in the rotation axis direction, pressing force to the inner circumferential end face of the glass substrate 20 by the inner circumference polishing section 110 can be adjusted to have an even and appropriate value, that is, the inner circumference polishing section can be elastically pressed to the glass substrate 20, consequently inner diameter circularity and concentricity, which are more stable and smaller, and low inner diameter tolerance can be achieved. Moreover, since such a slide mechanism can be operated without stopping rotation of the polishing drive section, the inner circumference polishing section 110 can be adjusted even during polishing the polishing object.

In such a polishing method, since the rotation axis of the inner circumference polishing section need not be revolved or moved, polishing speed can be remarkably increased, and consequently productivity can be improved.

The expanding/contracting mechanism of the inner circumference polishing section 110 in the direction perpendicular to the extending direction of the rotation axis is not limited to the mechanism in the above case, and various mechanisms can be used, including an expanding/contracting mechanism using atmospheric pressure or oil pressure, and a mechanism of converting displacement of a rotation axis into displacement in the direction perpendicular to the extending direction of the rotation axis like a folding umbrella.

The polishing drive section 18 is connected to the rotation axis of the inner circumference polishing section 110, and can rotate the inner circumference polishing section 110 in both forward and reverse directions, and can be freely moved in the direction perpendicular to the extending direction of the rotation axis. At a side opposite to the polishing drive section 18, even a bearing 38 for fixing the rotation axis is provided via the inner circumference polishing section 110. As the bearing 38, various bearings can be used, including a bearing, ball bearing, roller bearing, and sliding bearing. Furthermore, the polishing drive section 18 is formed freely movably even in the rotation axis direction, so that it can vertically reciprocate the inner circumference polishing section 110 in the rotation axis direction. Moreover, in the embodiment, since it is only necessary that the inner circumference polishing section 110 and the polishing object are relatively rotated or moved, it is acceptable that the polishing drive section 18 is connected to the polishing object, and the polishing object is rotated or moved, thereby the inner circumferential end face of the polishing object is polished.

When a rotation direction of the polishing drive section 18 is fixed, a rotation direction of the support section 14 is correspondingly determined so as to be an opposite direction (relative direction) to the rotation direction of the inner circumference polishing section 110. Therefore, in FIG. 3, when the polishing drive section 18 is rotated in a CW direction, the support section 14 is rotated in a CCW direction. When the sections are rotated in opposite directions to each other in this way, relative angular velocity of polishing corresponds to sum of angular velocities of both the sections. A lower view of FIG. 3 shows a condition where the polishing body 112 and the polishing cloths 114 are slightly rotated in the CW direction compared with an upper view of FIG. 3.

A nozzle 40 as a polishing liquid supply section is provided close to a contact between the polishing object 12 and the inner circumference polishing section 110, so that a polishing liquid is supplied. When the polishing is performed, the polishing is preferably performed while supplying a polishing liquid containing abrasive grains from the nozzle 40. As the abrasive grains, typical abrasive grains such as grains of alumina, cerium oxide, and colloidal silica can be used depending on a shape of an objective end face. As a dispersion medium for dispersing the abrasive grains, which is not particularly limited, water is preferable in the light of cost, but any dispersion medium can be used, if it is typically used for polishing. Moreover, for the nozzle 40, various aspects can be used, for example, each of aspects can be used, including spray, blowing, water discharge, and coating using water flow, shower, water drops and the like.

Regarding a way of supplying the polishing liquid, for example, polishing may be performed while the polishing liquid is continuously supplied, or may be performed while the polishing liquid is intermittently supplied.

In a glass substrate subjected to inner-circumferential end face polishing (inner circumference polishing) according to the invention, the inner diameter circularity and the inner diameter tolerance can be significantly improved compared with in the past.

Specifically, the inner diameter circularity of a glass substrate obtained by performing the inner circumference polishing can be made to be 5 μm or less, preferably 3 μm or less, and more preferably 2 μm or less. Moreover, the inner diameter tolerance can be made to be 10 μm or less, preferably 5 μm or less, and more preferably 2 μm or less.

As the inner-circumferential end face polishing, for example, shape transferring processing can be used instead of shape copying processing such as polishing brush processing.

Thus, the inner diameter tolerance can be further reduced. Moreover, in the inner-circumferential end face polishing, since polishing can be performed while a rotation axis of the inner circumference polishing section 110 is allowed to correspond to a central axis of a stacked body of glass substrates (polishing object 12), the inner diameter circularity can be further improved.

Moreover, the invention can be applied to not only the inner circumferential end face of the cylindrical polishing object 12 in which the plurality of glass substrates 20 are stacked, but also an inner circumferential end face of a disk-like glass substrate 20 in which an inner hole is formed in the center, that is, the invention can be also applied to a single glass substrate 20. Therefore, even in a single glass substrate, an inner circumferential end face can be polished highly accurately.

While description was made on an example of polishing the inner circumferential end face of the cylindrical polishing object 12 in which the plurality of glass substrates 20 are stacked in the above description, for example, the inner circumferential end face of one glass substrate may be polished as a polishing object by using the above method. According to the above method, since circularity can be improved compared with in the past, a glass substrate for a magnetic disk preferably used for a magnetic disk can be obtained.

Moreover, while the support section 14 is fixed, and the inner circumference polishing section 110 is rotated for polishing in the embodiment, such a case is not restrictive, and it is possible that the inner circumference polishing section 110 is fixed, and the support section 14 is rotated, or both the sections are rotated in opposite (relative) directions to each other.

Moreover, a glass substrate 20 is provided, of which the inner circumferential end face has a shape being formed flat by the above polishing method. The sidewall portion 22 of a glass substrate 20, which is polished by the brush polishing or the pad polishing in the past, is formed to have a rounded convex shape. However, in a polishing method according to the embodiment, since the sidewall portion 22 is polished in face contact with the polishing cloths at even pressure, flatness of the sidewall portion 22 can be secured, and even if it is used for a magnetic disk for HDD, fitness with a rotation spindle axis can be improved, and thus dust is reduced, so that improvement in reliability can be achieved.

Moreover, a method of manufacturing a glass substrate for a magnetic disk according to the invention, which includes an inner circumference polishing step of polishing an inner circumferential end face as an inner-hole surface of a disk-like glass substrate having an inner hole formed in its center, may be designed such that a polishing member is inserted into the inner hole of the glass substrate, then polishing parts of the polishing member are expanded in a direction perpendicular to an axial direction of the polishing member, thereby the polishing parts are elastically pressed to the inner circumferential end face, and while the center of the inner hole of the glass substrate is allowed to correspond to an axis of the rod-like polishing member, at least one of the glass substrate and the polishing member is relatively moved, so that the inner circumferential end face of the glass substrate is polished.

Moreover, a method of manufacturing a glass substrate for a magnetic disk, which includes an inner circumference polishing step of polishing an inner circumferential end face of a cylindrical polishing object in which a plurality of disk-like glass substrates, each having an inner hole formed in its center, are stacked on one another may be designed such that a rod-like polishing member is inserted into an inner hole of a polishing object, then polishing parts of the polishing member are expanded in a direction perpendicular to an axial direction of the polishing member, thereby the polishing parts are elastically pressed to the inner circumferential end face, and while the center of the inner hole of the glass substrate is allowed to correspond to an axis of the rod-like polishing member, at least one of the glass substrate and the polishing member is relatively moved, so that the inner circumferential end face of the glass substrate is polished.

(Polishing of Chamfered Portion (Chamfered Surface Polishing Step))

It is also possible that after the sidewall portion (T surface) 22 of the inner circumferential end face of the glass substrate 20 is polished by the above polishing method, the chamfered portion (chamfered surface) (C surface) 24 is polished. Such a chamfered portion 24 may be polished by brush polishing using the polishing brush 42, or may be polished using the following polishing method.

In the embodiment, polishing cloths are used, which are contactable to the chamfered portion 24 at one side of the inner hole formed in the center of the glass substrate 20 over the whole circumference of the chamfered portion 24 at a time, and while the polishing cloths are pressed to the chamfered portion of the inner hole, the polishing cloths and the glass substrate are relatively moved so that the chamfered portion 24 is polished. Here, "relative movement" may refer to a motion that one of the polishing cloths and the glass substrate 20 is driven, or a motion that both are driven. The polishing method of the chamfered portion is performed by sheet-feed polishing in which glass substrates are polished one by one, rather than batch polishing (batch processing) in which the stacked glass substrates 20 are polished. Hereinafter, the polishing method is described in detail using a chamfered-portion polishing apparatus.

Figure 5:
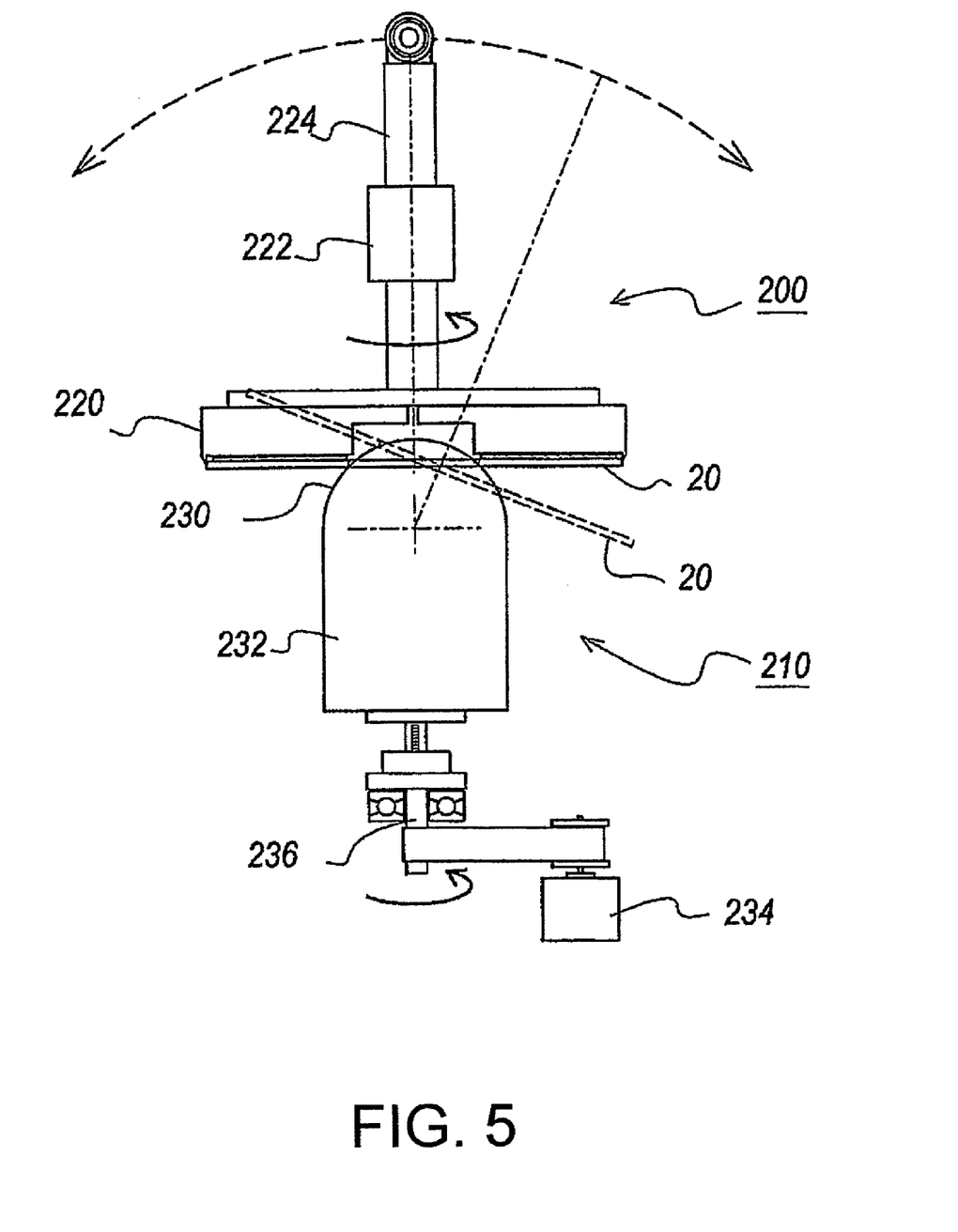
FIG. 5 shows a block diagram showing a schematic configuration of a chamfered-portion polishing apparatus used in the invention.

FIG. 5 shows a block diagram showing a schematic configuration of a chamfered-portion polishing apparatus. Such a chamfered-portion polishing apparatus is configured by a substrate support section 200 and a polishing cloth support section 210. The chamfered portions 24 of the glass substrate 20 as an object of polishing are provided at both ends of the inner hole at a predetermined angle (for example, 45°) with respect to a main surface of the glass substrate 20.

The substrate support section 200 includes a holder 220 for holding the glass substrate 20, an arm 224 being fixedly connected to the holder 220 in a swingable manner, and a torque converter 222 that connects between the holder 220 and the arm 224 in a freely rotatable manner with a predetermined load.

The polishing cloth support section 210 rotatably supports a spherical polishing cloth 232 having a spherical portion 230 at its end. As a material of the spherical polishing cloth 232, foamed resin such as polyurethane can be used. The spherical polishing cloth 232 is rotationally driven by a support shaft 236 transmitted with power of a motor 234. The spherical portion 230 of the spherical polishing cloth 232 presses a chamfered portion 24 at one side of the inner hole of the glass substrate 20 so as to be contacted to the chamfered portion 24 over the whole circumference of the chamfered portion 24 at a time. When polishing is performed, relative positions of the rotational axis of the glass substrate 20 and a rotational axis of the spherical polishing cloth 232 may be changed by swinging the arm 224.

The chamfered-portion polishing apparatus is used to polish only the chamfered portion 24, thereby the chamfered portion 24 can be sufficiently mirror-polished with a small removal depth. Therefore, when a magnetic disk is produced using the glass substrate 20, occurrence of corrosion (precipitation of cobalt or sodium into a surface of the magnetic disk) from the chamfered portion 24 can be prevented. Moreover, since removal depth is small, processing time is reduced, consequently productivity can be improved. Furthermore, since the spherical portion 230 does not polish the side face 22, inner-diameter circularity and processing accuracy of the side face 22 are not affected by the described processing method of the inner circumferential end face, consequently reduction in the circularity and accuracy due to polishing of the chamfered portion 24 may not occur.

(Other Modes)

In the description, description is made on a configuration where the polishing cloths 114, that is, the polishing pads are used for the inner circumference polishing section 110, and the abrasive grains being free abrasive grains are used to polish the inner circumferential end face of the glass substrate. However, the invention is not limited to the above, and for example, it is acceptable that polishing stones being fixed abrasive grains are used instead of the polishing cloths 114 of the inner circumference polishing section 110, and the inner circumferential end face is polished while coolant is supplied to the inner circumferential end face. Moreover, it is acceptable that while coolant is supplied to an inner circumferential end face, the inner circumferential end face is polished with a circumference polishing section 110 including the fixed grinding stones (fixed abrasive grains), then while free abrasive grains are supplied to the inner circumferential end face, the inner circumferential end face is polished with a circumference polishing section 110 including the polishing cloths 114. In this way, the inner circumferential end face is polished using the fixed abrasive grains, then it is polished using the free abrasive grains, which makes it possible to reduce a load applied to the polishing cloths.

(End Face Polishing after Strengthening)

Next, description is made on a step that a glass substrate is subjected to chemical strengthening treatment, then the inner circumferential end face is polished.

A compressive stress layer is formed on a surface of the glass substrate through the chemical strengthening treatment. While thickness of the compressive stress layer to be formed is different depending on thickness of the glass substrate, for example, in the case of the glass substrate in a size of 2.5-inch disk or 1.8-inch disk, which is largely used as a glass substrate for a magnetic disk, thickness of the glass substrate is 0.5 to 1.0 mm, and preferable depth (thickness) of the compressive stress layer in this case is 100 to 200 µm. The compressive stress layer is formed not only on a main surface of the glass substrate, but also on an inner circumferential end face (including a chamfered surface).

When the glass substrate is subjected to chemical strengthening treatment, a dimension of inner diameter of the substrate is changed. Moreover, the inner diameter dimension is changed depending on a composition of a chemical strengthening treatment liquid, and on a chemical strengthening treatment condition.

In this way, the inner diameter dimension of the glass substrate is changed through the chemical strengthening treatment. However, the glass substrate is required to have strict dimension accuracy (inner diameter circularity and inner diameter tolerance) as described before. Thus, the inner-circumferential end face polishing is performed after the chemical strengthening treatment step, and thereby a glass substrate having excellent dimension accuracy can be manufactured with strength being increased through the chemical strengthening treatment.

Therefore, when the inner-circumferential end face polishing is performed after the chemical strengthening treatment step has been performed, the removal amount of the compressive stress layer formed on the substrate end face needs to be reduced to the utmost, and dimension accuracy needs to be improved. To satisfy this condition, specifically, the removal amount in the inner-circumferential end face polishing is preferably 5 μm or less, and more preferably 3 μm or less.

After the inner-circumferential end face polishing, thickness of the compressive stress layer formed on the inner-circumferential end face of the glass substrate is preferably 50 μm or more, more preferably 100 μm or more, and further more preferably 150 μm or more. A dimension and a shape to be required are as described before.

(Main Surface Polishing)

By performing inner circumference polishing of the invention, inner diameter circularity and inner diameter tolerance of a glass substrate can be improved. Thus, a glass substrate for a magnetic disk that enables higher recording density can be provided. To achieve higher recording density, roughness of the main surface needs to be decreased in addition to improving a parameter on the inner diameter of the glass substrate. Specifically, for example, when surface roughness (Ra) of a glass substrate for a magnetic disk is measured by an atomic force microscope, the surface roughness (Ra) is preferably 0.2 nm or less, and more preferably 0.1 nm or less.

Hereinafter, an example using the described polishing method or polishing apparatus is described.

EXAMPLE 1

In the example, a glass substrate for a magnetic disk and a magnetic disk were manufactured through the following steps. Particularly, in an end face polishing step, the polishing method according to the embodiment is used.

(1) Shaping Step and First Lapping Step

First, melted alminosilicate glass was molded into a disk shape by direct press using an upper mold, a lower mold, and a sleeve mold, so that amorphous plate-like glass was obtained. As the alminosilicate glass, glass for chemical strengthening was used. In addition to direct press, the disk-like glass substrate for a magnetic disk may be obtained by cutting sheet glass, which is formed by a down draw method or float method, by a grinding stone. As the alminosilicate glass, chemical strengthening glass was used, which mainly contains $SiO_2$ of 58 to 75 wt %, $Al_2O_3$ of 5 to 23 wt %, $Li_2O$ of 3 to 10 wt %, and $Na_2O$ of 4 to 13 wt %.

Next, both main surfaces of the plate-like glass were subjected to lapping to be formed into a disk-shaped glass base material. The lapping was performed using alumina-based free abrasive grains by a double-side lapping apparatus using a planetary gear mechanism. Specifically, lapping boards were pressed to both sides of the plate-like glass from above and below, and while an abrasive liquid containing free abrasive grains was supplied onto the main surfaces of the plate-like glass, the lapping boards and the plate-like glass were relatively moved to each other to perform lapping. A glass base material of which the main surfaces were flat was obtained through the lapping.

(2) Cutting Step (Coring and Forming)

Next, the glass base material was cut using a diamond cutter, and a disk-shaped glass substrate was cut from the glass base material.

Next, a circular hole was formed in a central portion of the glass substrate using a cylindrical diamond drill, so that a donut-shaped glass substrate was formed (coring). Then, an inner circumferential end face and an outer circumferential end face were ground by diamond grinding stones so as to be subjected to predetermined chamfering processing (forming).

(3) Second Lapping Step

Next, both main surfaces of the obtained glass substrate were subjected to second lapping as in the first lapping step. By performing the second lapping step, a fine irregular shape, which was formed on each main surface in the cutting step or the end face polishing step as a precedent step, can be removed beforehand, consequently a subsequent polishing step for the main surfaces can be completed in a short time.

(4) End Face Polishing Step

Next, an end face of the glass substrate was mirror-polished by using the described polishing apparatus and polishing method according to the embodiment. In this case, a slurry (free abrasive grains) containing cerium-oxide abrasive grains was used for abrasive grains. Then, the glass substrate that has been subjected to the end face polishing step was rinsed. Through the end face polishing step, each of the end faces of the glass substrate was processed into a mirror surface by which generation of dust such as particles was able to be prevented.

In the end face polishing step, while glass substrates are superposed on one another, end faces thereof are polished, and to avoid the main surfaces of the glass substrate from being scratched at that time, the end face polishing step may be performed before a first polishing step described later, or may be performed before and after a second polishing step.

In such an end face polishing step, the polishing cloths of the polishing section are made in face contact to the inner circumferential end face of the polishing object, and pressing force in such face contact is made uniform, thereby high processing accuracy can be obtained. Evaluation results on processing accuracy in the embodiment compared with that in a prior-art polishing method are described below.

[Evaluation]

The polishing method according to the example and a polishing method in the past were used to evaluate polishing accuracy and polishing speed of the inner circumferential end face of the glass substrate.

In the case that an inner circumferential end face was polished while it was in face contact with polishing cloths including foamed polyurethane, polishing speed was 74 μm/min. On the other hand, polishing speed was 0.7 μm/min in a prior-art example (comparative example) in which an inner circumferential end face was polished as in the example using a brush. From this result, it is known that when the polishing according to the example is performed, polishing speed is high compared with a prior art, in other words, removal depth per unit time is large.

Next, inner diameter circularity was compared between the example and the comparative example. In the case of the example, deviation from a target value was about 0.35 to 0.65 μm. Moreover, inner diameter circularity was 2 μm in the example. On the other hand, in the case of polishing using the brush, deviation from a target value had a large range, about 0.7 to 6.7 μm with an average of 1.47 μm. In the comparative example, inner diameter circularity was 10 μm. In the case that a rod-like polishing pad as the prior-art example (comparative example) was used, and the inner circumferential end face was polished while the rod-like polishing pad was revolved, as a result, deviation from a target value had a range of about 1.1 to 4.0 μm with an average of 2.14 μm. In this case, inner diameter circularity was 9 μm. Moreover, in the case of the example, even if removal depth was changed, a range of variation from a target value was kept within the above range.

Next, inner diameter tolerance in each of the example and the comparative example is shown in Table 1. Removal depth in the inner circumference polishing step was 5 μm or less. The number of glass substrate samples was 10,000.

TABLE 1

| Target value | Ratio of values within target value range | |
|---|---|---|
| | Tolerance of ±25 μm | Tolerance of ±10 μm |
| Example | 100% | 100% |
| Comparative example | 97.9% | 95.6% |

That is, by using the manufacturing method according to the invention, inner diameter tolerance can be securely controlled to be 25 μm or less, and furthermore, 10 μm or less.

From the results, it can be understood that when polishing according to the example is performed, polishing can be performed without variation in inner diameter circularity unlike the prior art.

Moreover, polishing according to the example was performed, and change in removal depth with respect to processing time was measured, as a result, the removal depth was linearly increased with respect to processing time. Therefore, the inner circumference can be easily processed in an optional removal depth only by adjusting the processing time, and consequently a dimension of the removal depth is easily managed. Moreover, since reproducibility of the removal depth with respect to processing time is high, sizing can be performed stably and accurately.

In this way, according to the polishing apparatus and the polishing method according to the embodiment, high processing accuracy can be achieved, that is, inner diameter circularity or concentricity can be made small and stable, and inner diameter tolerance can be kept low.

(5) Main Surface Polishing Step

As a main surface polishing step, a first polishing step was first performed. The first polishing step is performed mainly for removing scratches or strain remained on a main surface in the lapping step. In the first polishing step, a double-side polishing apparatus having a planetary gear mechanism was used to polish the main surface by using a hard resin polisher. Cerium oxide abrasive grains were used for a polishing liquid.

More specifically, a preliminary polishing step was performed using a polishing apparatus that was able to polish both main surfaces of each of 100 to 200 glass substrates at a time. A polishing pad was used, in which grains of zirconium oxide and cerium oxide were contained beforehand.

A polishing liquid in the first polishing step was prepared by mixing cerium oxide abrasive grains having an average grain diameter of 1.1 μm into water. Abrasive grains having a grain diameter of more than 4 μm were removed beforehand. As a result of measuring the polishing liquid, the abrasive grains contained in the polishing liquid had a maximum diameter value of 3.5 μm, an average diameter value of 1.1 μm, and D50 value of 1.1 μm.

Besides, a load applied to the glass substrate was 80 to 100 g/cm$^2$, and removal thickness of a surface portion of the glass substrate was 20 to 40 μm.

The glass substrate that had been subjected to the first polishing step was sequentially dipped in respective cleaning tanks of neutral detergent, pure water, and IPA (isopropyl alcohol), and thus washed.

Next, a second polishing step was performed as the main surface polishing step. The second polishing step is performed for finishing the main surfaces into mirror surfaces. In the second polishing step, the main surfaces were polished into mirror surfaces using a soft foamed resin polisher by a double-side polishing apparatus having a planetary gear mechanism. Colloidal silica grains were used as abrasive grains contained in a polishing liquid.

More particularly, a mirror polishing step was performed using a polishing apparatus in a planetary gear type, which was able to polish both main surfaces of each of 100 to 200 glass substrates at a time. As a polishing pad, a soft polisher was used.

A polishing liquid in the second polishing step was prepared by adding sulfuric acid and tartaric acid into ultrapure water, and further adding colloidal silica grains having a diameter of 40 nm into the ultrapure water. In this preparation, concentration of the sulfuric acid in the polishing liquid was 0.15 wt %, and a pH value of the polishing liquid was 2.0 or less. Concentration of the tartaric acid was 0.8 wt %, and the content of the colloidal silica grains was 10 wt %.

In the second polishing step, the pH value of the polishing liquid was not varied, and able to be kept to be approximately constant. In the example, the polishing liquid supplied on the surface of the glass substrate was collected by using a drain, then cleaned by removing foreign substances by a mesh filter, and then resupplied onto the glass substrate to be reused.

Polishing speed in the second polishing step was 0.25 μm/min, from which it was known that advantageous polishing speed was able to be achieved at the above condition. The polishing speed was obtained by dividing reduction amount (processing removal depth) of thickness of a glass substrate necessary for finishing a surface into a predetermined mirror surface by required polishing time.

The glass substrate that had been subjected to the second polishing step was sequentially dipped in respective cleaning tanks of neutral detergent, pure water, and IPA (isopropyl alcohol), and thus washed. Each cleaning tank was applied with an ultrasonic wave.

A surface of the glass substrate after cleaning was observed by AFM (Nanoscope manufactured by Digital Instruments Inc.) (measurement in a rectangular area of 5 μm×5 μm), as a result, maximum peak height (Rmax) was 1.5 nm, and arithmetic mean roughness (Ra) was 0.15 nm. Adhesion of the colloidal silica abrasive grains was not confirmed. Moreover, any foreign substance such as stainless steel or iron was not found. Increase in roughness of the substrate surface was not found between before and after the cleaning.

(6) Chemical Strengthening Step

Next, the glass substrate that had been subjected to the lapping step and the polishing step was subjected to chemical strengthening. The chemical strengthening was performed through a process that a chemical strengthening solution including potassium nitrate (60%) and sodium nitrate (40%) being mixed to each other was prepared, and the chemical strengthening solution was previously heated to 400° C., and the cleaned glass substrate was preheated to 300° C., and dipped for about 3 hours in the chemical strengthening solution. The dipping was performed in a manner that a plurality of glass substrates were accommodated in a holder such that the glass substrates were held at their end faces respectively in order to chemically strengthen the whole surface of each glass substrate.

The glass substrate is subjected to dipping treatment in the chemical strengthening solution in this way, thereby lithium ions and sodium ions in a surface of the glass substrate are substituted by sodium ions and potassium ions in the chemical strengthening solution respectively, so that the glass substrate strengthened. Thickness of a compressive stress layer formed in the surface of the glass substrate was about 100 μm to 200 μm.

The glass substrate that had been subjected to chemical strengthening was dipped in a water tank at 20° C. and thus rapidly cooled, and kept for about 10 min therein. The glass substrate that had been subjected to rapid cooling was dipped in concentrated sulfuric acid heated to about 40° C. so as to be cleaned. Furthermore, the glass substrate that had been subjected to sulfuric acid cleaning was sequentially dipped in respective cleaning tanks of pure water and IPA (isopropyl alcohol), and thus washed. Each cleaning tank was applied with an ultrasonic wave.

As described above, the first lapping step, cutting step, end face polishing step, second lapping step, first and second polishing steps, fine cleaning, and chemical strengthening step were performed, so that a glass substrate for a magnetic disk being flat, smooth, and highly stiff was obtained.

(7) Fine Cleaning Step

Next, fine cleaning of the glass substrate for a magnetic disk was performed. The fine cleaning is performed to remove the residue of a polishing agent or a foreign iron-based contamination or the like to be a cause of head crush or a thermal asperity trouble so that a glass substrate having a smooth and clean surface is obtained. In the fine cleaning step, a water rinse cleaning step and an IPA cleaning step were performed after alkaline solution cleaning.

(8) Magnetic Disk Manufacturing Step

Next, for both sides of the glass substrate obtained through the above steps, an adhesion layer including a Cr alloy, a soft magnetic layer including a CoTaZr-based alloy, a base layer including Ru, a perpendicular magnetic recording layer including a CoCrPt-based alloy, a protective layer including carbon hydride, and a lubricating layer including perfluoropolyether were sequentially deposited on each surface of the glass substrate, so that a perpendicular magnetic recording disk was manufactured. While this configuration shows an example of a configuration of the perpendicular magnetic recording disk, the magnetic layer and the like may be configured as an in-plane magnetic disk.

The obtained magnetic disk was confirmed to have no defect found in each film such as a magnetic layer due to a foreign substance. Moreover, the magnetic disk was subjected to a glide test, as a result, hit (a phenomenon that a head scratches a projection on a magnetic disk surface) or crush (a phenomenon that a head collides with the projection on the magnetic disk surface) was not found. Furthermore, a reproducing test was performed using a magnetoresistive head, as a result, false operation caused by thermal asperity was not found in reproducing.

EXAMPLE 2

A glass substrate for a magnetic disk was manufactured in the same way as in the example 1 except for performing a chemical strengthening step before an end face polishing step in the descried manufacturing method. Removal depth of the inner circumferential end face in the end face polishing step was 4 μm, and inner diameter circularity of the glass substrate was 3 μm after the end face polishing step. A magnetic disk was manufactured in the same way as in the example by using the glass substrate for a magnetic disk. The magnetic disk was subjected to a glide test, as a result, hit or crush was not found. Furthermore, a reproducing test was performed using a magnetoresistive head, as a result, false operation caused by thermal asperity was not found in reproducing.

While the preferred embodiment of the invention was described with reference to accompanying drawings hereinbefore, it will be appreciated that the invention was not limited to such embodiment. It is obvious that those skilled in the art may think of various alterations or modifications within a category according to claims, and it can be understood that they naturally belong to the technical scope of the invention.

For example, while only the inner circumference polishing section is used for polishing of the inner circumferential end face in the embodiment, it can be used in combination with another polishing material, for example, a polishing brush. In this case, first, the polishing brush is used to roughly polish the inner circumferential end face and chamfered portions, and then the inner circumference polishing section is used for final finishing.

A method of manufacturing a glass substrate for a magnetic disk according to the embodiment, in which an inner circumferential end face of a cylindrical polishing object is polished, the polishing object including a plurality of plate-like (or acceptably disk-like) glass substrates stacked on one another, each substrate having an inner hole formed in its center, may be designed such that polishing cloths are pressed in face contact to the inner circumferential end face, then a polishing liquid is supplied between the inner circumferential end face of the polishing object and an inner circumference polishing section, and then the inner circumference polishing section is turned on its own axis so as to polish the relevant inner circumferential end face.

Industrial Applicability

The invention can be applied to a method of manufacturing a glass substrate for a magnetic disk, a method of manufacturing a magnetic disk, and a polishing apparatus of the glass substrate for a magnetic disk.

The invention claimed is:

1. A method of manufacturing a glass substrate for a magnetic disk, comprising an inner circumference polishing step in which an inner circumferential end face of a cylindrical polishing object is polished, the polishing object including a plurality of disk-like glass substrates stacked on one another, each of the disk-like glass substrates having an inner hole formed in its center, wherein, in the inner circumference polishing step:

a plurality of polishing cloths disposed around a rotation axis of an inner circumference polishing section having the rotation axis are contacted by pressure to the inner circumferential end face of the polishing object at even pressure and are pressed in face contact to the inner circumferential end face as a whole of the polishing object, then a polishing liquid, which is a slurry including free abrasive grains, is supplied between the inner circumferential end face of the polishing object and the inner circumference polishing section, and then the inner circumference polishing section and the polishing object are relatively rotated/moved with the rotation axis as a center, or relatively moved in a direction of the rotation axis, thereby the inner circumferential end faces of said plurality of disk-like glass substrates are mirror-polished, and wherein:

while the center of the inner hole of each of the disk-like glass substrates is allowed to correspond to the rotation axis of the inner circumference polishing section, the inner circumferential end faces of said plurality of disk-like glass substrates are mirror-polished, said plurality of polishing cloths are disposed around the rotation axis of the inner circumference polishing section with a space left between adjacent ones of said plurality of polishing cloths, the spaces between said plurality of polishing cloths are passages of the slurry, and outer diameter formed by outer surfaces of said plurality of polishing cloths is formed to have a curved surface along an inner diametrical shape of each of said plurality of disk-like glass substrates, said outer diameter fits with a circumferential surface of inner diameter of each of said plurality of disk-like glass substrates.

2. The method of manufacturing a glass substrate for a magnetic disk according to claim 1, wherein:
the plurality of polishing cloths are arranged to be an even number of polishing cloths.

3. The method of manufacturing a glass substrate for a magnetic disk according to claim 1, wherein:
the plurality of polishing cloths are moved in a direction perpendicular to an extending direction of the rotation axis, thereby the inner circumference polishing section is contacted by pressure to the inner circumferential end face of the polishing object.

4. The method of manufacturing a glass substrate for a magnetic disk according to claim 1, wherein:
a sliding surface sloped with respect to a rotation axis direction is formed on an inner circumferential edge of the inner circumference polishing section, and
a drill rod is provided, which is slidably contacted to the sliding surface, and
the polishing cloths are moved in a direction perpendicular to an extending direction of the rotation axis by a wedge effect of the drill rod.

5. The method of manufacturing a glass substrate for a magnetic disk according to claim 1, wherein:
a contact surface between the polishing cloths and the inner circumferential end face of the polishing object occupies at least 50% of the inner circumferential end face of the polishing object.

6. The method of manufacturing a glass substrate for a magnetic disk according to claim 1, wherein:
an outline of each of the polishing cloths has a shape in accordance with the inner circumferential end face of the polishing object.

7. A method of manufacturing a glass substrate for a magnetic disk, by which an inner circumferential end face of a cylindrical polishing object is polished, the polishing object including a plurality of disk-like glass substrates stacked on one another, each of the disk-like glass substrates having an inner hole formed in its center, wherein:
polishing cloths are pressed in face contact to the inner circumferential end face as a whole of the polishing object at even pressing force,
then a polishing liquid, which is a slurry including free abrasive grains, is supplied between the inner circumferential end face of the polishing object and the inner circumference polishing section,
and then the polishing cloths and the inner circumferential end face are relatively moved, thereby the inner circumferential end faces of said plurality of disk-like glass substrates are mirror-polished.

8. A method of manufacturing a glass substrate for a magnetic disk, by which an inner circumferential end face of a disk-like glass substrate is polished, the disk-like glass substrate having an inner hole formed in its center, wherein:
a plurality of polishing cloths disposed around a rotation axis of an inner circumference polishing section having the rotation axis are contacted by pressure to the inner circumferential end face as a whole of the disk-like glass substrate at even pressure and are pressed in face contact to the inner circumferential end face of the disk-like glass substrate,
then a polishing liquid, which is a slurry including free abrasive grains, is supplied between the inner circumferential end face of the disk-like glass substrate and the inner circumferential end polishing section,
and then the inner circumferential end polishing section and the disk-like glass substrate are relatively rotated/moved with the rotation axis as a center, or relatively moved in a direction perpendicular to a main surface of the disk-like glass substrate, thereby the inner circumferential end face of the disk-like glass substrate is mirror-polished, and wherein:
while the center of the inner hole of the disk-like glass substrate is allowed to correspond to the rotation axis of the inner circumference polishing section, the inner circumferential end face of the disk-like glass substrate is mirror-polished,
said plurality of polishing cloths are disposed around the rotation axis of the inner circumference polishing section with a space left between adjacent ones of said plurality of polishing cloths, the spaces between said plurality of polishing cloths are passages of the slurry, and
outer diameter formed by outer surfaces of said plurality of polishing cloths is formed to have a curved surface along an inner diametrical shape of the disk-like glass substrate, said outer diameter fits with a circumferential surface of inner diameter of the disk-like glass substrate.

9. A method of manufacturing a magnetic disk, wherein:
at least a magnetic layer is formed on a surface of the glass substrate obtained according to the method of manufacturing a glass substrate for a magnetic disk according to claim 1.

10. A polishing apparatus of a glass substrate for a magnetic disk, which polishes an inner circumferential end face of a cylindrical polishing object including a plurality of disk-like glass substrates stacked on one another, each of the disk-like glass substrates having an inner hole formed in its center, the apparatus comprising:
an inner circumference polishing section that has a rotation axis, and has a plurality of polishing cloths disposed around the rotation axis, and presses the plurality of polishing cloths to the inner circumferential end face of the polishing object at even pressure and in face contact to the inner circumferential end face of the polishing object,
a polishing liquid supply section that supplies a polishing liquid, which is a slurry including free abrasive grains, between the polishing cloths and the inner circumferential end face of the polishing object, and
a polishing drive section that relatively rotates/moves the inner circumference polishing section and the polishing object with the rotation axis as a center, or relatively moves the section and the object in a rotation axis direction so that the inner circumferential end faces of said plurality of disk-like glass substrates are mirror-polished, wherein:
in said polishing drive section, while the center of the inner hole of each of the disk-like glass substrates is allowed to correspond to the rotation axis of the inner circumference polishing section, the inner circumferential end faces of said plurality of disk-like glass substrates are mirror-polished,
said plurality of polishing cloths are disposed around the rotation axis of the inner circumference polishing section with a space left between adjacent ones of said plurality of polishing cloths, the spaces between said plurality of polishing cloths are passages of the slurry, and
outer diameter formed by outer surfaces of said plurality of polishing cloths is formed to have a curved surface along an inner diametrical shape of each of said plurality of disk-like glass substrates, said outer diameter fits with a circumferential surface of inner diameter of each of said plurality of disk-like glass substrates.

11. A method of manufacturing a glass substrate for a magnetic disk, including an inner circumference polishing step of polishing an inner circumferential end face of a cylindrical polishing object including a plurality of disk-like glass substrates stacked on one another, each of the disk-like glass substrates having an inner hole formed in its center, wherein:
  a polishing member, which has a rotation axis and polishing parts provided around the rotation axis, is inserted into an inner hole of the polishing object,
  then the polishing parts are expanded in a direction perpendicular to the rotation axis of the polishing member, thereby the polishing parts are elastically pressed to the inner circumferential end face of the polishing object at even pressing force and are contacted in face contact to the inner circumferential end face of the polishing object, and
  while the center of the inner hole of each of the disk-like glass substrates is allowed to correspond to the rotation axis of the polishing member, at least one of the polishing object and the polishing member is relatively moved, so that the inner circumferential end faces of said plurality of disk-like glass substrates are mirror-polished, wherein:
  the polishing parts comprise polishing cloths, respectively, and a polishing liquid, which is a slurry including free abrasive grains, is supplied between the polishing cloths and the inner circumferential end face, and
  then at least one of the polishing object and the polishing member is relatively moved, thereby the inner circumferential end faces of said plurality of disk-like glass substrates are mirror-polished, and
  wherein:
  the polishing cloths are disposed around the rotation axis of the polishing member with a space left between adjacent ones of said plurality of polishing cloths, the spaces between said plurality of polishing cloths are passages of the slurry, and
  outer diameter formed by outer surfaces of the polishing cloths is formed to have a curved surface along an inner diametrical shape of each of said plurality of disk-like glass substrates, said outer diameter fits with a circumferential surface of inner diameter of each of said plurality of disk-like glass substrates.

12. The method of manufacturing a glass substrate for a magnetic disk according to claim 11, wherein:
  the plurality of polishing parts of the polishing member are provided in positions reverse to one another.

13. The method of manufacturing a glass substrate for a magnetic disk according to claim 1, wherein:
  the method further includes a chemical strengthening treatment step in which each of the disk-like glass substrates is contacted to a chemical strengthening treatment liquid, thereby part of ions contained in each of the disk-like glass substrates are substituted by ions in the chemical strengthening treatment liquid, so that each of the disk-like glass substrates is chemically strengthened, and
  the inner circumference polishing step is performed after the chemical strengthening treatment step, and
  the inner circumferential end face of each of the disk-like glass substrates is polished in the inner circumference polishing step such that at least part of a compressive stress layer is remained, the compressive stress layer being formed on the inner circumferential end face of each of the disk-like glass substrates by the chemical strengthening treatment step.

14. The method of manufacturing a glass substrate for a magnetic disk according to claim 13, wherein:
  thickness of the compressive stress layer formed in the chemical strengthening treatment step is 50 μm or more.

15. The method of manufacturing a glass substrate for a magnetic disk according to claim 13, wherein:
  removal depth is less than 5 μm in the inner circumference polishing step.

16. The method of manufacturing a glass substrate for a magnetic disk according to claim 1, wherein:
  the inner circumferential end face is polished in the inner circumference polishing step such that circularity of an inner hole is within 5 μm.

17. The method of manufacturing a glass substrate for a magnetic disk according to claim 1, wherein:
  the method further comprises a main surface polishing step of polishing a main surface of each of the disk-like glass substrates, and
  the main surface is polished in the main surface polishing step such that surface roughness (Ra) is 0.2 nm or less when the surface roughness is measured by an atomic force microscope.

18. The method of manufacturing a glass substrate for a magnetic disk according to claim 1, wherein:
  each of the disk-like glass substrates has a chamfered surface between the main surface and the inner circumferential end face, and
  the method further comprises a chamfered surface polishing step,
  in which polishing cloths are used, the polishing cloths being contactable to the chamfered portion over the whole circumference of the chamfered portion at a time, and
  while the polishing cloths are pressed to the chamfered portion over the whole circumference of the chamfered portion at a time, the polishing cloths and the glass substrate are relatively moved, thereby the chamfered surface is polished.

19. The method of manufacturing a glass substrate for a magnetic disk according to claim 1, wherein an outline formed by the outer surfaces of the plurality of polishing cloths formed on a curved surface having the same radius as that of the inner circumferential end face of the polishing object.

20. The method of manufacturing a glass substrate for a magnetic disk according to claim 7, wherein an outline formed by the outer surfaces of the polishing cloths is formed on a curved surface having the same radius as that of the inner circumferential end face of the polishing object.

21. The method of manufacturing a glass substrate for a magnetic disk according to claim 8, wherein an outline formed by the outer surfaces of the plurality of polishing cloths is formed on a curved surface having the same radius as that of the inner circumferential end face of the disk-like glass substrate.

22. The polishing apparatus of a glass substrate for a magnetic disk according to claim 10, wherein an outline formed by the outer surfaces of the plurality of polishing cloths is formed on a curved surface having the same radius as that of the inner circumferential end face of the polishing object.

23. The method of manufacturing a glass substrate for a magnetic disk according to claim 11, wherein an outline formed by the outer surfaces of the polishing cloths is formed on a curved surface having the same radius as that of the inner circumferential end face of the polishing object.

* * * * *